(12) United States Patent  (10) Patent No.: US 10,307,698 B2
Berg  (45) Date of Patent: Jun. 4, 2019

(54) MULTIPLE CARTRIDGE FLUID FILTER CANISTER

(71) Applicant: Jacob H. Berg, Fort Myers, FL (US)

(72) Inventor: Jacob H. Berg, Fort Myers, FL (US)

( * ) Notice: Subject to any disclaimer, the term of this patent is extended or adjusted under 35 U.S.C. 154(b) by 0 days.

(21) Appl. No.: 15/874,637

(22) Filed: Jan. 18, 2018

(65) Prior Publication Data

US 2018/0318734 A1  Nov. 8, 2018

Related U.S. Application Data

(60) Provisional application No. 62/500,610, filed on May 3, 2017.

(51) Int. Cl.
*B01D 29/52* (2006.01)
*B01D 29/15* (2006.01)
*E04H 4/12* (2006.01)

(52) U.S. Cl.
CPC ............ *B01D 29/52* (2013.01); *B01D 29/15* (2013.01); *B01D 2201/0453* (2013.01); *B01D 2201/29* (2013.01); *E04H 4/1209* (2013.01)

(58) Field of Classification Search
CPC ................................ B01D 29/52; B01D 29/15
See application file for complete search history.

(56) References Cited

U.S. PATENT DOCUMENTS

| | | | | |
|---|---|---|---|---|
| 4,322,293 A | * | 3/1982 | Morgan, Jr. | B01D 29/27 210/232 |
| 5,173,186 A | * | 12/1992 | Spafford | B01D 29/21 210/455 |
| 2008/0135467 A1 | * | 6/2008 | Martin | B01D 37/025 210/209 |
| 2014/0091021 A1 | * | 4/2014 | Wnuk | B01D 29/52 210/108 |
| 2016/0051912 A1 | * | 2/2016 | Castaneda | B01D 29/52 210/323.2 |

* cited by examiner

*Primary Examiner* — Chester T Barry
(74) *Attorney, Agent, or Firm* — William E. Noonan

(57) ABSTRACT

A multiple cartridge fluid filter canister for mounting operatively in a standard filter housing includes spaced part upper and lower support plates that engage respective ends of a plurality of elongate filter cartridges that extend between the upper and lower support plates. The upper support plate carries an upper positioning element that depends from the upper support plate for engaging an upper end of a respective filter cartridge. The lower support plate carries a corresponding lower positioning element that extends upwardly from the lower support plate to engage a lower end of the filter cartridge. Annular seals surround the upper and lower positioning elements for respectively interengaging and sealing the upper and lower ends of the filter cartridge to restrict fluid flow between the cartridge and the upper and lower support plates. The upper and lower support plates define one or more inlets and outlets that communicate with corresponding fluid flow inlet and outlet lines in the filter housing.

17 Claims, 6 Drawing Sheets

MULTIPLE CARTRIDGE FLUID FILTER CANISTER

FIELD OF THE INVENTION

This invention relates to a multiple cartridge fluid filter canister and more particularly to a filter canister particularly suited for use with a swimming pool.

BACKGROUND OF THE INVENTION

Conventional swimming pool filtration systems usually employ pleated surface media filters for removing debris that collects in the pool. Such filters must be cleaned and changed on a regular basis, which can be tedious, inconvenient and expensive. Although high quality pleated plastic fiber filters can be fairly effective in removing dirt and debris from the pool water, such contaminants create a fairly substantial pressure differential across the filter, which increases steadily over time as the filter ages. Water flow through the filter is thereby gradually reduced so that the pool is cleaned less effectively. As a result, the filter must be cleaned or changed sooner than desired in order to regain an effective flow rate. Frequent cleaning and replacement of the filter media also contributes to the inefficient and wasteful use of water and cleaning chemicals. Replaced pleated cartridge filters must be disposed of, typically in a landfill, which has a negative environmental impact.

SUMMARY OF THE INVENTION

It is therefore an object of the present invention to provide an improved fluid filter canister, which allows for a virtually unlimited variety of filter media to be conveniently and effectively utilized for filtering swimming pools and other liquid applications.

It is a further object of this invention to provide a filter canister that provides for a significantly improved fluid flow rate and which achieves effective and reliable filtration without requiring frequent cleaning and replacement as is needed by conventional pleated filters.

It is a further object of this invention to provide a filter canister, which employs a plurality of filter cartridges with increased solids holding capacity that may be quickly and conveniently replaced, as needed, to maintain an increased fluid flow rate and thereby continuous and reliable clarification.

It is a further object of this invention to provide a filter canister that allows the user to conveniently select and utilize various different types of filter media including, but not limited to depth string wound varieties, molded fibers, screens, stacked chips, pleated papers and other filter materials specifically suited for the user's desired application.

It is a further object of this invention to provide a filter canister that is especially effective for use in filtering the water circulated through swimming pools, spas and the like, and which particularly facilitates the time, effort and expense required to properly maintain the filtration system of such structures.

It is a further object of this invention to provide a filter canister that enables the user to maintain a high fluid flow rate while reducing back pressure on the pump seal and premature pump or motor failure resulting therefrom.

It is a further object of this invention to provide a pool filter canister that does not have to be replaced nearly as often as conventional pleated surface media and which therefore generates much less landfill waste and has a much more favorable environmental impact.

It is a further object of this invention to provide a canister especially suited for swimming pools, which employs a plurality of depth type filter cartridges that are quick and easy to remove and replace and which exhibit a significantly prolonged service life and require far less frequent servicing and replacement than existing filter media.

This invention features a multiple cartridge fluid filter canister for operatively mounting within a filter housing that has a fluid inlet and a fluid outlet. The canister includes upper and lower support plates that are releasably interconnected to one another by an elongate connector that extends generally centrally between the upper and lower support plates. A plurality of filter cartridges are supported between the upper and lower support plates. Each filter cartridge includes an elongate, generally cylindrical filter media component that is interengaged at an upper end thereof with a respective upper positioning element attached to and depending from the upper support plate. The cartridge is also interengaged at a lower end thereof with a respective lower positioning element attached to and projecting upwardly from the lower support plate. Corresponding and generally aligned upper and lower positioning elements hold each filter cartridge in a fixed position between the upper and lower support plates. Each upper positioning element is surrounded by an annular seal carried by the upper support plate for engaging and sealing the upper end of the filter media component to restrict fluid flow between the upper support plate and the upper end of the filter media component. Likewise, a corresponding lower annular seal carried by the lower support plate surrounds the corresponding lower positioning element for engaging and sealing the lower end of the filter cartridge to restrict fluid flow between the lower support plate and the lower end of the filter cartridge. The upper and lower support plates further include at least one canister inlet and at least one canister outlet that communicate respectively with the fluid inlet and outlet lines of the filter housing.

In a preferred embodiment, each filter cartridge may include an elongate tubular member that extends between a corresponding pair of upper and lower positioning elements. The lower positioning element may include a standpipe attached to the lower support plate and defining an opening that extends through the lower support plate. The upper positioning element may include a solid rod or stud. Alternatively, the upper positioning element may include a standpipe and the lower positioning element may comprise a solid stud or rod.

Each cartridge may include an elongate tubular member that is interengaged at upper and lower ends thereof with the upper and lower positioning elements respectively. Typically, the tubular member of the cartridge receives a respective positioning element. When the positioning element is a pipe, the elongate tubular member is thereby communicably interconnected with that pipe for permitting fluid flow therethrough. The tubular member may include a series of perforations that permit fluid flow between the filter media component and the interior of the elongate tubular member. This provides for fluid circulation through the filter cartridge.

The upper and lower filter seals may have various sizes and cross sectional configurations, which complement the filter media material used in a particular filter application. For example, the annular seal may include a wedge, diamond or knife-edge cross-sectional configuration or a rounded O-ring type cross sectional shape.

The upper and lower support plates may be releasably interconnected by an elongate canister tube that extends centrally between the upper and lower support plates. A lower end of the tube may be communicably connected to an inlet of the filter housing and an upper end of the tube may be open for introducing fluid flow into the filter housing. The upper end of the canister tube may include exterior threads that are operatively engaged by a screw cap to selectively open and close the canister. In particular, the screw cap may be tightened onto the canister tube to effectively squeeze the upper and lower support plates together so that filter cartridges mounted between the upper and lower support plates are effectively and sealably secured in place. Alternatively, the screw cap may be loosened to separate the upper and lower support plates. This allows filter cartridges to be removed from between the plates and replaced as required. The cartridges may be assembled as a kit. Individual cartridges may be replaced as needed simply by opening the canister. This eliminates having to purchase an entire closed canister in order to replace a single cartridge. Filter efficiency is improved and costs are reduced.

In alternative embodiments, the upper and lower support plates may be interconnected by a threaded rod that extends between the upper and lower plates. The lower end of the rod may extend through a central canister inlet formed in the lower support plate. An upper end of the rod may extend through the upper support plate and a fastening knob may be threadably interengaged with the upper end of the rod. The knob is turned to selectively interconnect and disconnect the upper and lower support plates relative to one another.

The filter cartridges may comprise a virtually unlimited variety of types and sizes of filter media. This includes string wound depth type media, molded fibers, melt blown material, screens, particulate or pleated surface type filters. The type and size of the media would be selected according to the particular filtration requirements associated with the purification, chemical reaction or other process being addressed.

In still other embodiments, the canister includes upper and lower support plates that are adhesively or otherwise permanently fastened to the upper and lower ends respectively of the filter cartridges. Each such filter cartridge includes an elongate, generally cylindrical filter media component having an interior conduit extending longitudinally therethrough and in communication with an exterior of the filter media component.

The adhesively or otherwise permanently fastened upper and lower support plates may again include respective upper and lower positioning elements, as well as annular seals surrounding such positioning elements. The upper and lower support plates may further include at least one canister inlet and at least one canister outlet. Each cartridge conduit may be communicably interconnected between the canister inlet and the canister outlet.

Multiple canisters may be mounted within a single filter housing in accordance with this invention. In addition, various numbers of filter cartridges may be employed within each canister. In any event, the fluid flow rate is improved considerably and the time required between servicing and replacement of the filter material is beneficially extended.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
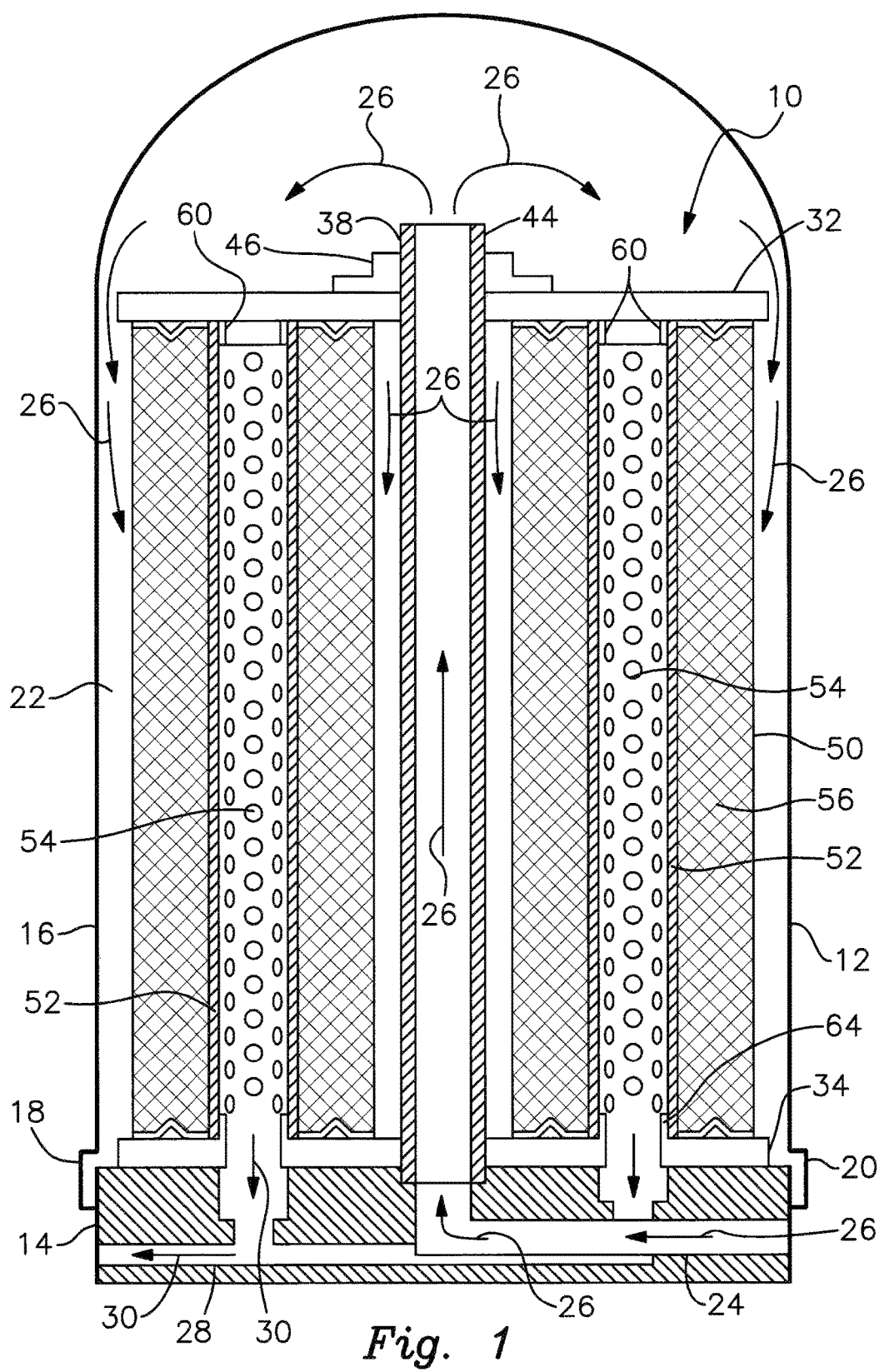
FIG. 1 is an elevational, cross sectional view of a preferred multiple cartridge filter canister in accordance with this invention.

There is shown in FIG. 1 a fluid filter canister 10 operatively mounted within a conventional filter housing 12. It should be understood that the filter canister of this invention is particularly suited for use in a filtration system normally utilized with a swimming pool, spa or similar structure where water is circulated through the system. However, the filter canister may alternatively be used in various other applications requiring filtration or purification of a fluid flow. These can include various applications involving the flow of water or various other chemicals. The particular environment and application in which the canister is utilized is not a limitation of this invention.

As shown in FIG. 1, filter housing 12 includes a base 14 to which an upper shell 16 is releasably attached, by means of clips 18 and 20. Shell 16 includes a housing interior 22 for receiving canisters and/or cartridges which incorporate the filter media required for a particular filtering operation. An inlet line 24 introduces fluid flow into chamber 22 as indicated by arrows 26. After filtration is performed, either by conventional filters or in the manner described below, the filtered fluid is discharged through an outlet line 28 as indicated by arrows 30. The construction of filter housing 12 and the various components thereof is conventional. A wide variety of alternative containers and other structures may be employed for utilizing a canister 10 in accordance with this invention. The canister described is particularly suited for use in the filter housing of a swimming pool filtration system, although canister 10 may alternatively be employed in the context of various alternative filtration systems.

Figure 2:
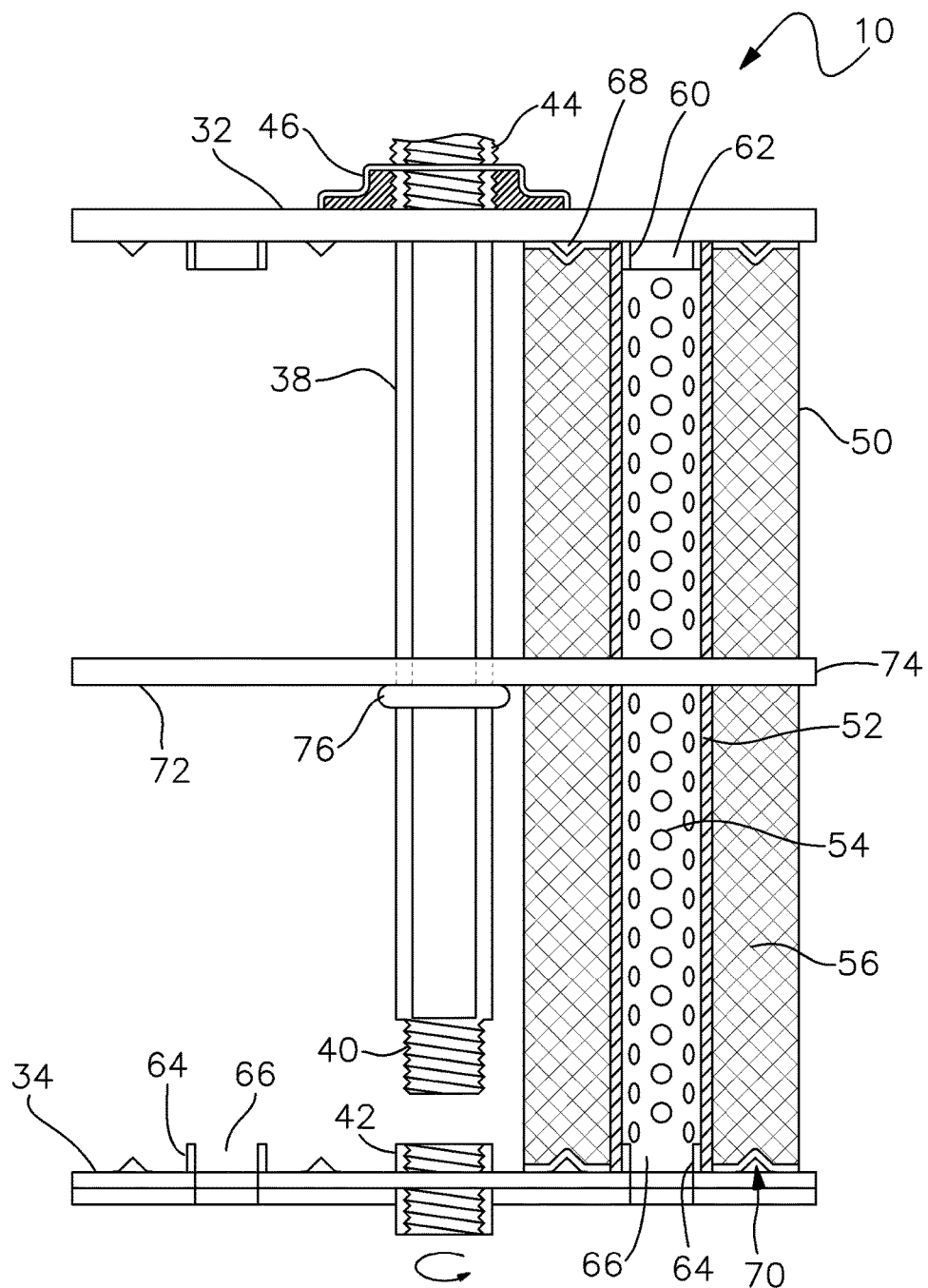
FIG. 2 is an elevational, fragmentary and partially cross sectional view of the canister depicting a single representative filter cartridge and a cartridge divider plate utilized within the canister.

As shown in FIGS. 1-2, canister 10 includes an upper support plate 32 and a lower support plate 34. The upper and lower support plates 32 and 34 are typically composed of a durable plastic or elastomeric material. Upper support plate 32 is releasably interconnected to lower support plate 34 by means of an elongate connector tube 38 that operably interconnects the upper and lower support plates. As shown, for example in FIG. 2, the lower threaded end 40 of tube 38 may be interengaged with a cylindrical fitting 42 forming a canister assembly inlet through an opening in lower plate 34. The upper end 44 of tube 38 may extend through a hole in upper plate 32 and is likewise threaded for receiving a screw cap 46. Tube 38 is open at both the upper and lower ends as also shown in FIG. 1.

Figure 3:
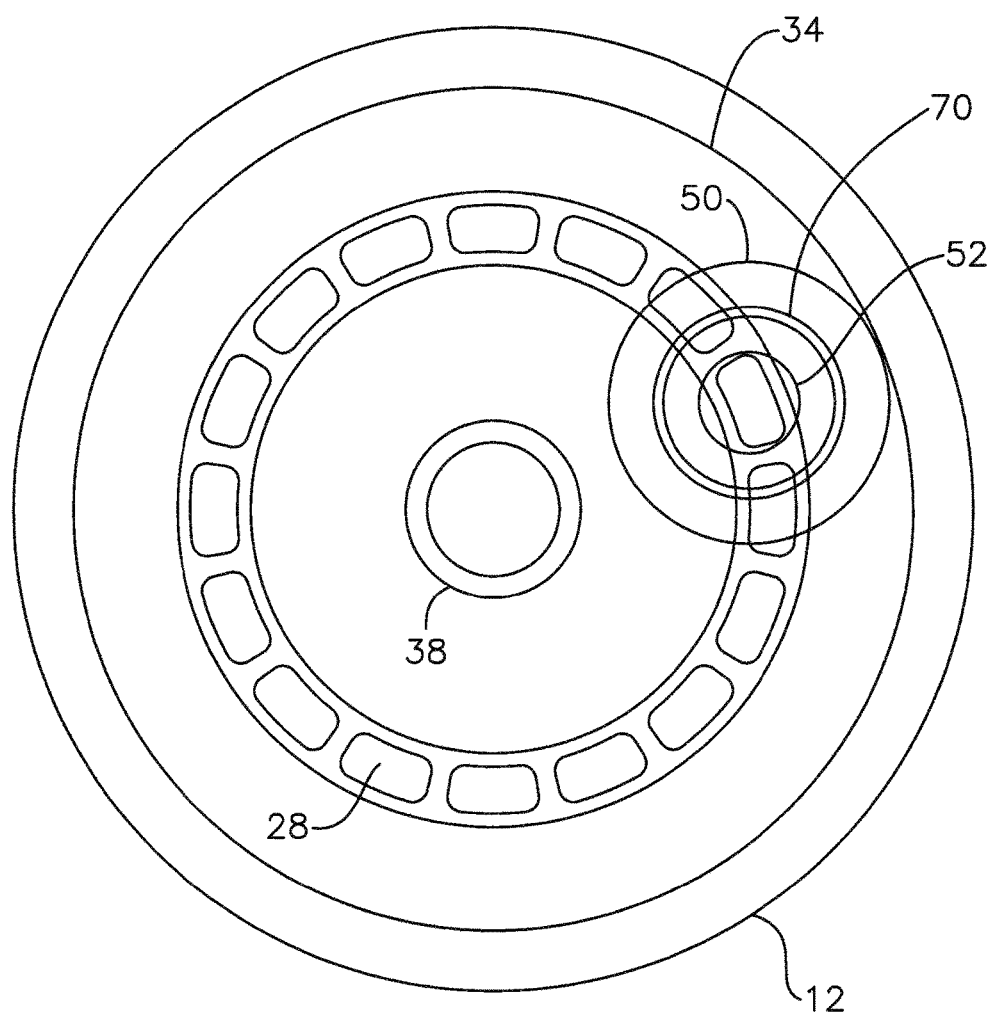
FIG. 3 is a top view depicting how a representative cartridge is positioned within the canister and optionally aligned with fluid outlets in the filter housing.

A plurality of filter cartridges 50 are replaceably mounted between plates 32 and 34. A representative pair of cartridges 50 are shown in FIG. 1 and a single representative filter cartridge 50 is illustrated in FIGS. 2 and 3. In particular, each filter cartridge includes a conduit defined by a central pipe 52 having a plurality of perforations 54, which function as described more fully below. Each pipe 52 is surrounded by a filter media component 56, which may comprise any suitable filtration media required for the particular filter application involved. This preferably includes, but is not limited to string wound depth type media, molded fibers and melt blown, pleated surface, stacked chip or other alternative filtration media. Depth type filter media has a solid retaining capacity about 5-6 times that of conventional pleated fillers and is particularly effective for achieving a prolonged high flow rate. Any alternative material capable of providing filtration, purification or a desired type of chemical reaction may be also utilized. The size and specifications of the selected filtration media may be varied within the scope of this invention. Typically, the cartridge 50 has a diameter of approximately 2½"-2¾" and a selected length that fits in the housing. The cartridges are evenly spaced to provide an effectively high flow rate for extended durations. It should be further understood that although only one or two representative filter cartridges are disclosed herein, canister 10 may include various other numbers of elongate cartridges 50 disposed between upper and lower plates 32 and 34 and arranged circumferentially about tubular connector 38. Typically, six or eight cartridges 50 are equally spaced about tube 38.

The upper and lower plates 32 and 34 are provided with structure for sealably, yet releasably retaining cartridges 50. In particular, in the version shown in FIGS. 1 and 2, upper plate 32 includes a plurality of upper positioning elements 60 comprising cylindrical fittings or pipes that are attached to and depend from plate 32. A respective positioning element 60 is provided for each filter cartridge 50. Each positioning component 60 may be attached unitarily or separately to upper plate 32 and includes an opening 62, FIG. 2, that extends to the upper support plate.

Lower support plate 34 likewise carries a similar number of lower positioning components comprising upwardly projecting standpipes 64. Once again, standpipes 64 may be unitarily connected to lower plate 34 or formed separately therefrom and fitted thereto. A central opening 66 defining a canister assembly outlet is formed through each standpipe 64 and through the underlying support plate 34. Upper plate 32 and lower plate 34 respectively are constructed to include an upper cylindrical fitting 60 and a corresponding lower standpipe 64 for each filter cartridge utilized in the canister. Each standpipe 64 is generally aligned with a corresponding upper positioning fitting 60.

Upper and lower support plates 32 and 34 also respectively carry corresponding pairs of upper and lower annular seals 68 and 70. Each annular seal 68 encircles a respective cylindrical fitting 60 and each lower seal 70 surrounds a respective standpipe 64. The annular seals may have various cross sectional configurations such as the triangular/wedge or diamond shaped configurations shown in FIGS. 1 and 2. Alternatively, rounded or O-ring annular seals may be employed. Once again, these seals may be integral with or formed separately from the respective support plates 32 and 34. Plates 32 and 34 are thereby constructed to include an upper seal 68 and a corresponding lower seal 70 for engaging respective ends of each filter cartridge 50 mounted in the canister.

Cartridges 50 are assembled and installed in canister 10 in the following manner. Initially, the upper plate is disconnected from the lower support plate by unscrewing cap 46 from the threads at the upper end 44 of tube 38. Upper support plate 32 is then disengaged from tube 38. If one or more cartridges need to be replaced, those cartridges are simply disengaged from the canister in a manner that will be described more fully below. To install one or more new cartridges in the canister, each filter cartridge 50 is positioned in a substantially vertical orientation above a respective standpipe 64. The lower end of the filter cartridge is engaged with standpipe 64 in the manner shown in FIGS. 1 and 2 such that the standpipe is received within the open lower end of tubular member 52. The tubular member and standpipe are sized to provide a snug fit that nonetheless allows the cartridge to be quickly and conveniently engaged with and disengaged from the standpipe as needed using only modest manual force. After the filter cartridge is installed in this manner, the upper support plate 32 is re-engaged with the upper end 44 of tube 38. The upper support plate is oriented such that a corresponding cylindrical fitting 60 is aligned with the tubular member 52 of the filter cartridge 50 being installed. The fitting 60 is then pushed into the open upper end of tubular member 52 and screw cap 46 is tightened on the threaded upper end 44 of tube 38 so that the installed filter cartridge 50 is longitudinally compressed between the upper and lower support plates 32 and 34. Upper annular seal 68 is thereby pressed securely against the upper end of filter media 56 and lower annular seal 70 is similarly pressed against the lower end of filter media 56. This provides a secure, fluid tight seal that prevents fluid from passing between the upper and lower ends of filter cartridge 50 and upper and lower support plates 32 and 34 respectively.

Any number of filter cartridges 50 may be installed in the foregoing manner such that the filter cartridges are sealably and securely interengaged between upper and lower plates 32 and 34. Cartridges 50 are quickly and conveniently removed and replaced by simply unscrewing cap 46 from member 38 and disengaging upper support plate 32 from tube 38 and the upper ends of cartridges 50. Each filter cartridge requiring replacement is then disengaged from its respective standpipe 64 and the cartridge is effectively removed from the canister. Again, any number of cartridge filters 50 may be removed and replaced in this manner.

Typically six or eight sets of upper cylindrical fittings 60 and corresponding lower standpipes 64 are provide for supporting six or eight cartridges 50 between plates 32 and 34. Various spacings between the cartridges may be provided although equal angular spacing between the cartridges is especially preferred. Spacing may also be maintained by the use of an optional divider plate 72 shown in FIG. 2. Plate 72 has a central opening through which connector tube 38 extends. The divider plate also includes a plurality of circularly arranged openings 74, each for receiving a respective filter cartridge 50. The divider plate 72 is supported on tubular connector 38 for example by an O-ring 76.

Figure 4:
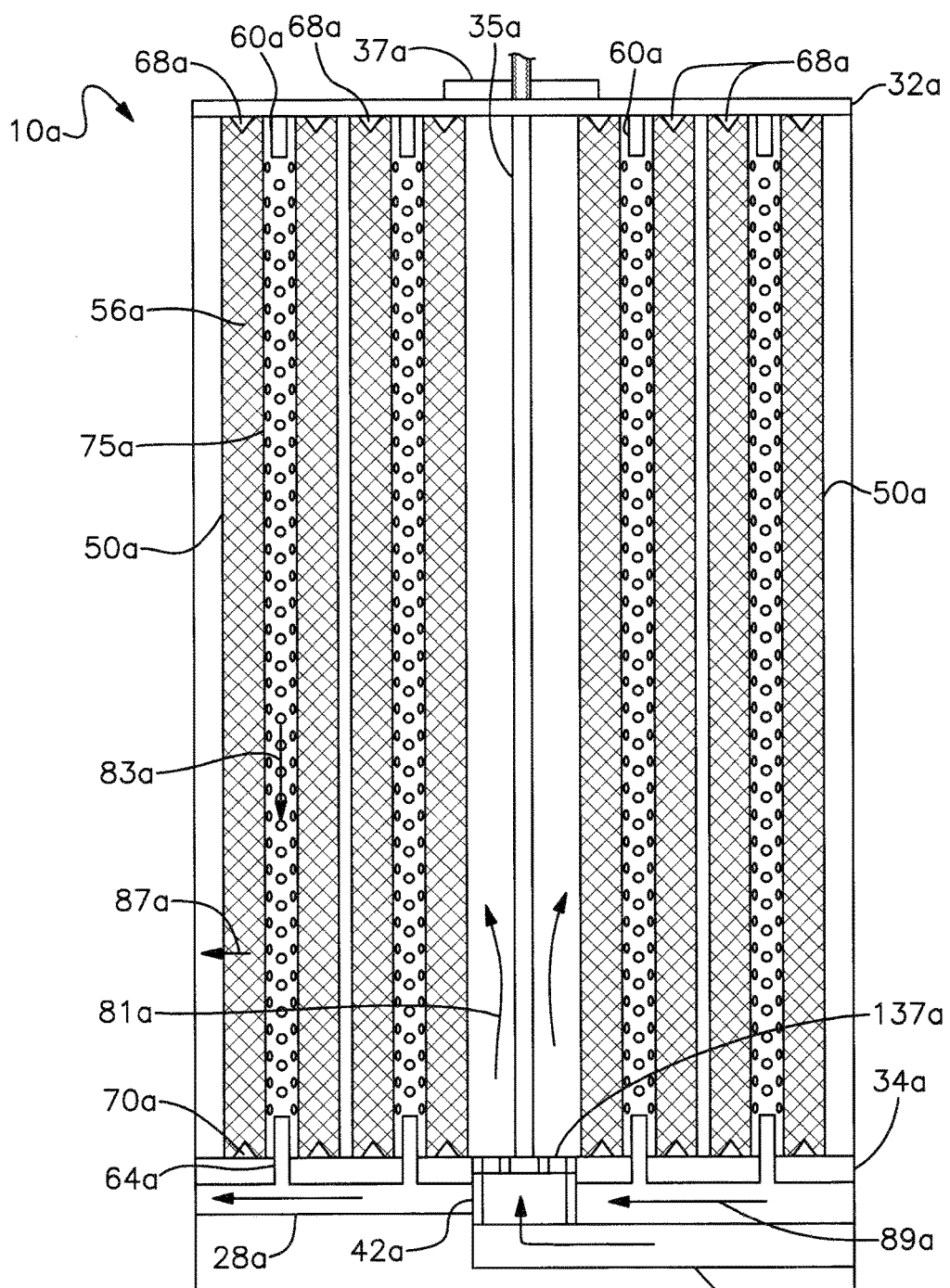
FIG. 4 is a perspective view of an alternative canister in accordance with this invention wherein the upper and lower support plates are interconnected by a threaded shaft or rod.

FIG. 4 depicts an alternative canister 10a in accordance with this invention. The canister again includes upper and lower support plates 32a and 34a, which are composed of a rugged plastic, metal and/or elastomeric material. As in the prior embodiment, the support plates have corresponding circular shapes. An optional circumferential lip may be formed around the outer periphery of plate 32a and depend therefrom. An upwardly turned lip likewise may be formed peripherally about lower support plate 34a. Plates 32a and 34a are interconnected by an elongate shaft or rod 35a. A lower end of rod 35a extends through a central hole formed in an inlet disk 137a mounted in the center of lower plate 34a. The assembled canister is received within a filter housing (not shown). The perforations in disk 137a communicate with a cylindrical canister assembly inlet fitting 42a, which is in turn communicably connected with an inlet line 24a in the base of the filter housing as previously described. The lower end of rod 35a may include threads (not shown) which are engaged by a nut (also not shown) to secure the rod to lower plate 34a. By the same token, the upper end of the rod may extend through an obscured opening in upper support plate 32a. Rod 35a is thereby releasably secured to plate 32a by a fastening knob or nut 37a that is threadably engaged with the upper end of rod 35a. Nut 37a may be selectively tightened or loosened to respectively secure the upper support plate 32a to rod 35a or detach the upper support plate from the rod as required.

Figure 5:
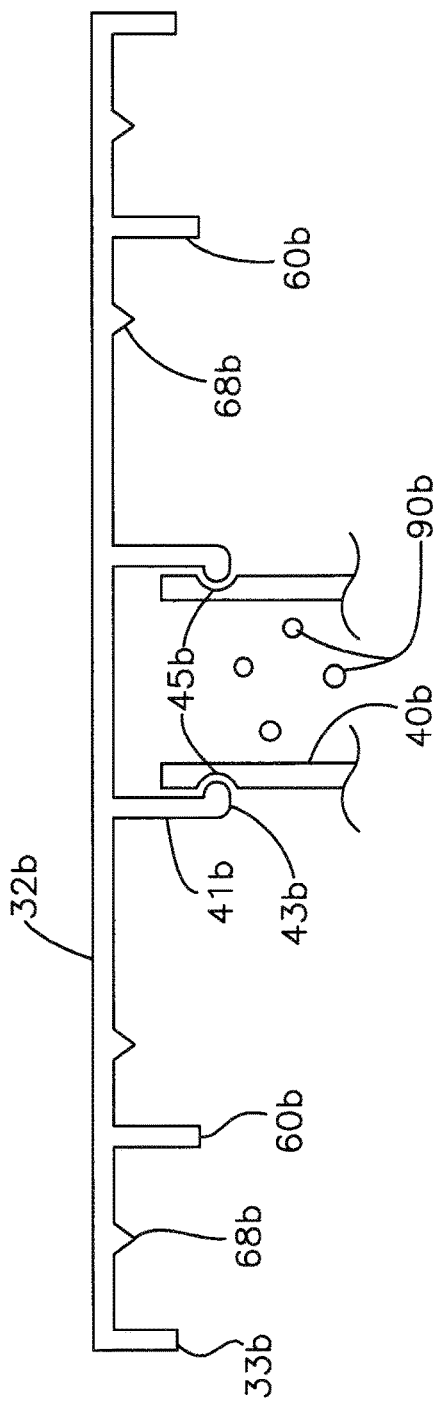
FIG. 5 is an elevational, cross sectional view of an alternative upper support plate and means for attaching that plate to a tubular connector of the canister.

Upper support plate 32a typically includes four, six or some other plurality of positioning studs 60a. Four such positioning studs are shown in FIG. 5. The positioning studs are connected integrally or separately to the bottom surface of plate 32a and depend/extend downwardly therefrom. The positioning studs are spaced at equal radial angles about connecting rod 35a. Each positioning stud is surrounded by an annular seal 68a, which is again formed in the bottom surface of support plate 32a. Unlike the previously described version, stud 60a is a solid component and does not include a central channel, although cylindrical studs or positioning elements may be employed.

As further shown in FIG. 4, lower support plate 34a carries four or some other plurality of standpipes 64a defining canister assembly outlets, which are analogous to those previously described. Each standpipe 64a is again surrounded by a rib-like annular seal 70a having a diamond configuration.

A filter cartridge 50a is shown operatively interconnected between upper support plate 32a and lower support plate 34a. Each cartridge 50a includes an axial conduit defined by a respective perforated pipe 75a. Each pipe is surrounded by filter media 56a, which may comprise various filter media types as previously described.

To assemble canister 10a, one or more cartridges 50a are installed between the upper and lower support plates 32a and 34a. In particular, upper plate 32a is disengaged from rod 35a and, as represented in FIG. 4, cartridge 50a is engaged with lower plate 34a such that conduit pipe 75a receives standpipe 64a. The upper support plate 32a is then engaged with the rod and a corresponding upper positioning stud 60a is inserted into the upper receptacle 73a of cartridge 50a. Another cartridge may be installed in a like manner between each other upper stud 60a and its corresponding/aligned lower standpipe 64a. Locking nut 37a is rotatably tightened on threaded rod 35a such that the upper and lower support plates are effectively squeezed together. Annular seal 68a is thereby pressed against the upper end of cartridge 50a and corresponding lower annular seal 70a is similarly pressed against the lower end of the cartridge. The upper and lower ends of each cartridge are thereby securely and sealably engaged with the upper and lower support plates respectively. Water or other fluid is prohibited from passing between the upper and lower support plates and the respective ends of the cartridge.

In the version in FIG. 4, cylindrical fitting 42a and standpipes 64a are designed to respectively communicate with the inlet line 24a and outlet line 28a of the filter housing. Depending upon the particular construction of the filter housing, these components may be reversed such that fitting 42a communicates with the inlet line and standpipes 64a communicate with the outlet line of the filter housing. In the former case, fluid flow is introduced through the inlet line fitting 42a and perforated disk 137a into the interior of canister 10a. As indicated by arrows 81a, water passes through the filter media 56a of filter cartridges 50a such that impurities and debris are captured by the filter media. The fluid then passes through axial pipes 75a as indicated by arrow 83a. This filtered fluid is discharged through the standpipes 64a and into the filter housing's outlet line 28a.

In a reverse flow situation, fluid may be introduced into the interior of canister 10a through standpipes 64a. The fluid is transmitted upwardly through axial pipes 75a and passes outwardly through the filter media 56a as indicated by arrow 87a. Once again, water may be filtered in this manner by each of the installed filter cartridges 50a. The fluid is then discharged through perforated disk 137a, conduit fitting 42a and the communicably connected line 28a of the filter housing, which in this scenario serves as the outlet line.

Figure 6:
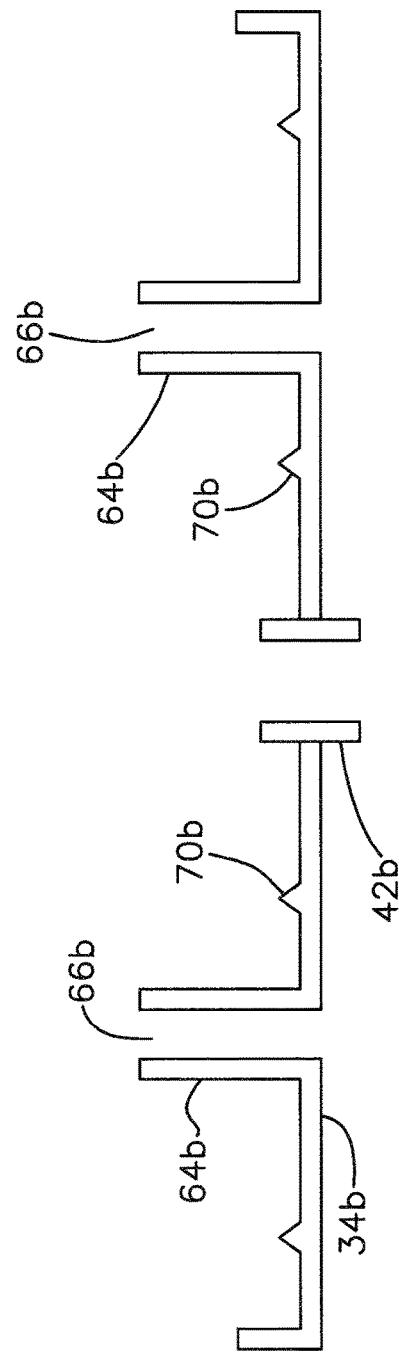
FIG. 6 is a cross sectional view of an alternative lower support plate in accordance with this invention.

FIGS. 5 and 6 respectively show different cross sectional configurations for the upper canister support plate 32b and lower canister support plate 34b. As shown in FIG. 5, the upper support plate 32b, which does not include water transmitting openings formed therethrough, includes a center support flange 41b having an annular rib 43b formed at its lower end. A central connecting tube 40b, as previously described in the version in FIGS. 1 and 2, may include an annular groove 45b, which interengages the rib 43b of receptacle 41b to secure the connecting tube 40b to the upper support plate 32b. In this version, tube 40b does not extend fully through the upper support plate. Fluid is introduced into and discharged from the canister from inlets and outlets formed in the bottom plate 34b. Otherwise, the upper support plate 32b is analogous to the plates previously described herein. In particular, plate 32b is provided with a plurality of upper positioning studs 60b, which respectively position the upper ends of the installed cartridges against the upper support plate. Each stud 60b is surrounded by an annular rib-like seal 68b, which seals the upper end of the installed cartridge when the upper support plate is engaged with the cartridge. A peripheral lip 33b depends from the upper support plate to further confine the installed cartridges.

Lower plate 34b, shown in FIG. 6, includes an inlet/outlet cylinder fitting 42b that is engageable with a lower end of tubular connector 40b shown in FIG. 5. Once again, this lower conduit fitting maybe threadably or slidably interengaged with the lower end of the connecting tube. FIG. 6 also depicts a pair of standpipes 64b as previously described. Each standpipe has a central opening 66b that extends through support plate 34b. As previously described in the version shown in FIG. 4, fluid may be introduced into the canister through the standpipe 66b and discharged from the canister through conduit 40b. Alternatively, fluid may be introduced through conduit 40b and discharged through standpipes 66b. In either case, tubular connector 46b includes perforations 90b for transmitting fluid to or from the interior of the canister as required.

Lower support plate 34b again includes an annular sealing rib 70b for engaging the bottom of each installed filter cartridge to restrict water flow between the lower end of the cartridge and the lower end of the support plate.

Figure 7:
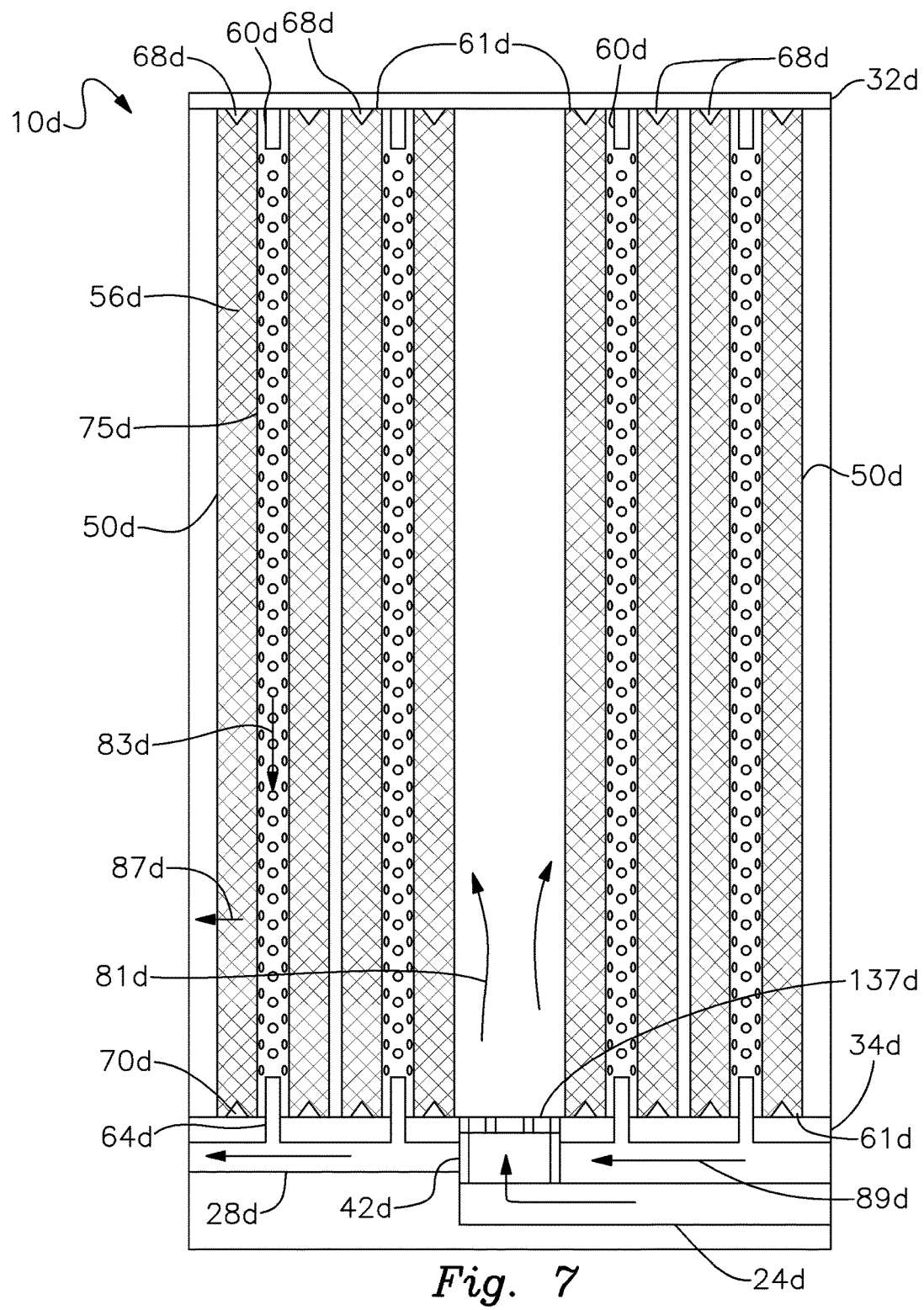
FIG. 7 is a cross sectional view of another alternative embodiment of the filter canister of this invention.

FIG. 7 shows an alternative canister 10d, which again includes upper and lower support plates 32d and 34d composed of a suitable plastic, metal and/or elastomeric material and have corresponding circular shapes. Circumferential lips, not shown, may be formed about the outer peripheries of the plates as previously described. A perforated inlet disk 137d is mounted centrally in lower plate 34d. The perforations in disk 137d communicate with a cylindrical canister assembly inlet fitting 42d, which is in turn communicably connected with an inlet line in the base of the filter housing as previously described.

Upper support plate 32d typically includes four, six or some other plurality of positioning studs 60d. Four such positioning studs are shown in FIG. 7. The positioning studs are connected integrally or separately to the bottom surface of plate 32d and depend downwardly therefrom. The positioning studs are spaced at equal radial angles about plate 32d. Each positioning stud is surrounded by an annular seal 68d, which is again formed in the bottom surface of plate 32d. Stud 60d is a solid component, although in alternative embodiments cylindrical studs or positioning elements may be utilized.

As further shown in FIG. 7, lower support plate 34d carries four, six, or some other plurality of standpipes 64d, which are analogous to those previously described. Each standpipe 64d is surrounded by a rib-like annular seal 70d having a sharp, diamond configuration.

A number of filter cartridges 50d are interconnected between upper support plate 32a and lower support plate 34a. In this version, the upper end of each cartridge 50d is adhesively or otherwise permanently fastened to the bottom surface of upper plate 32d. Likewise, the lower end of each cartridge 50d is adhesively fastened or otherwise permanently secured to the upper surface of lower plate 34d. The cartridges may be permanently and sealably fastened to the support plates at each end by a potted mastic or other adhesive 61d suitable for fluid filter applications and environments. Various cements and other adhesives may be employed within the scope of this invention. The adhesive should be strong enough to withstand the anticipated pressure of the fluid flow either upwardly or downwardly within the filter housing.

As in the previously described embodiment, each cartridge 50d is disclosed as including an axial conduit extending longitudinally through the cartridge and defined by a respective perforated pipe 75d. Each pipe is surrounded by and communicates with filter media 56d, which may comprise a depth-type media as previously described. It should be noted that in alternative embodiments, the central conduit and/or perforated pipe may be omitted. The upper and lower positioning elements 60d and 64d may also be omitted and the filter cartridges may be held in place by the cement or other adhesive alone. To assemble canister 10d in the manner shown in FIG. 7, a plurality of cartridges, and preferably six such cartridges, 50d, are installed between upper and lower support plates 32d and 34d. Adhesive 61d permanently fastens the cartridges between the upper and lower support plates such that the cartridges are not suitable for replacement and the canister is appropriate for a single use only.

As represented in FIG. 7, each cartridge 50d is engaged with lower plate 34d such that conduit pipe 75d receives a respective standpipe 64d. The upper support plates 32d engages each cartridge such that a corresponding upper positioning stud 60a is received by the upper end of conduit pipe 75d. Each upper stud is surrounded by a sharp, diamond-shaped annular seal 68d that presses against the upper end of filter media 56d. Corresponding lower annular deal 70d is similarly pressed against the lower end of the filter cartridge. The upper and lower ends of the cartridge and the filter media component are thereby securely and sealably engaged by the upper and lower support plates. Water is blocked from passing between the upper and lower support plates and the respective ends of each cartridge.

In FIG. 7, cylindrical canister assembly inlet fitting 42d and standpipe 64d, which comprises a canister assembly outlet, are designed to respectively communicate with the inlet line 24d and outlet line 28d of the filter housing. However, as in the other embodiments, this is not a limitation of this invention. Depending upon the particular construction of the filter housing, these components may be reversed such that fitting 42a communicates with the inlet line and standpipes 64d communicates with the outlet line of the filter housing. In the former case, fluid flow is introduced through the inlet line fitting 42d and perforated disk 137d into the interior of canister 10d. As indicated by arrows 81d, water passes through the filter media 56d of filter cartridges 50d such that impurities and debris are captured by the filter media. The fluid then passes through pipe 75d as indicated by arrow 83d. The filtered water/fluid is discharged through the standpipe 64d and into the filter housings outlet line.

In a reverse flow situation, fluid may be introduced into the interior of canister 10d through standpipes 64d, which serve as canister inlets. Fluid is then transmitted upwardly through pipes 75d and passes outwardly through the filter media as indicated by arrow 87d. Once again, water may be filtered in this manner by each of the installed filter cartridges 50d. Fluid is then discharged through the perforated disk 137d, conduit fitting 42d and the communicably connected line 28d of the filter housing, which in this scenario serves as the outlet line.

It should be understood that the filter canister assembly may include various other forms of canister assembly inlets and outlets within the scope of this invention. Various inlet and outlet configurations may be employed for the canister. In each case, the supported filter cartridges should communicably interconnect the inlet and outlet of the canister. The inlet and outlet of the canister should then, in turn, be communicably interconnected with the inlet and outlet respectively of the filter housing. In all versions, annular seals are preferably carried by the upper and lower support plates for engaging the upper and lower ends respectively of each cartridge so that a secure seal is formed at each end.

It should be understood that the structural details of the various canister versions disclosed herein may be interchanged, re-arranged and utilized to provide filtration in accordance with this invention. Critically, fluid is introduced into the canister and transmitted through each of the filter cartridges. The typically narrow diameter (2½"-2¾") filter cartridges are spaced evenly apart by the upper and lower positioning elements to provide for an effective uniform flow rate. Various alternative filtration media materials, and especially highly efficient depth type filter media, which have hitherto not been used in the swimming pool filter industry, may be utilized to provide much improved and efficient filtration. Reduced pressure differentials and significantly increased fluid flow rates for longer durations are thereby achieved, which not only enhances water clarity, but also dramatically prolongs the time that the filter can operate effectively without requiring cleaning or replacement. Indeed, cleaning can be eliminated entirely and the cartridges may be simply replaced as needed. This conserves water and chemicals currently used to clean filters. It also saves considerable labor and expense and reduces stress on the pool pump. The canister further provides for environmental benefits because the number of filters that must be disposed of in landfills is greatly reduced.

The canister optionally also provides for a convenient kit that allows for smaller individual filter cartridges to be quickly and easily purchased and replaced as needed. This version is shown in FIGS. 1, 2 and 4.

Alternatively, the canister itself essentially serves as a filter cartridge, which is conveniently replaceable as needed. For example, the version featuring permanently sealed cartridges, shown in FIG. 7, is intended for a single use.

The canister is effectively able to utilize a virtually unlimited variety of filter media which enables the user to successfully address a wide assortment of filtration needs. Cartridges employing a depth media are especially effective. Such filter media capture solids of various sizes within respective layers of the media. Significantly improved filtration is achieved, particularly when depth wound media are utilized in combination with the annular sealing ring that engages each end of the filtration media component. This structure is particularly effective in trapping solids and preventing such solids from bypassing the filter cartridges. In addition, depth wound filter media feature increased solid retention capacity within the successive layers of the media. Each successive layer is progressively denser. As a result, such media feature less flow restriction. Initially, higher flow rates significantly improve the rate of water clarification. Because such filter media exhibit increased storage capacity of solids, water flow rates are improved and the service life between canister replacement or cleaning is greatly extended.

Employing the annular ring for sealing each end of the individual filter cartridges within the canister and equally spacing the cartridges within the canister helps to achieve greatly improved flow performance and a very low pressure drop across the filter media. Again, this contributes greatly to improved water clarity.

It should be understood that multiple canisters constructed in accordance with this invention may be utilized in the filter housing. In addition, the number of filter cartridges employed in any one filter canister may be varied as required.

From the foregoing it may be seen that the apparatus of this invention provides for a multiple cartridge fluid filter canister. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A multiple cartridge fluid filter canister assembly for operatively mounting within a filter housing, which housing has a fluid inlet and a fluid outlet, said filter canister assembly comprising:

upper and lower support plates that are releasably interconnected by an elongate connector extending generally centrally between said upper and lower support plates;

a plurality of filter cartridges supported between said upper and lower support plates, each said filter cartridge including an elongate, generally cylindrical filter media component interengaged at an upper end thereof with a respective upper positioning element attached to and depending from said upper support plate, said cartridge being interengaged at a lower end thereof with a respective lower positioning element attached to and projecting upwardly from said lower support plate, said respective upper and lower positioning elements being generally aligned and holding each said filter cartridge in a fixed position between said upper and lower support plates;

each said upper positioning element being surrounded by a corresponding upper annular seal carried by said upper support plate for engaging and sealing said upper end of said filter media component of a respective said cartridge to restrict fluid flow between said upper plate and said upper end of said filter media component;

each said lower positioning element being surrounded by a corresponding lower annular seal carried by said lower support plate for engaging and sealing said lower end of said filter cartridge to restrict fluid flow between said lower support plate and said lower end of said filter cartridge; and at least one filter canister assembly inlet and at least one filter canister assembly outlet that communicate respectively with the fluid inlet and fluid outlet of the filter housing; said upper and lower support plates being releasably interconnected by an elongate canister tube that extends centrally between said upper and lower support plates, said canister tube for communicably interconnecting an interior of the filter housing with one of the inlet and outlet of the filter housing.

2. The assembly of claim 1 in which said filter media component includes a depth filter media.

3. A swimming pool filter canister assembly for operatively mounting within a swimming pool filter housing, which housing has a fluid inlet and a fluid outlet, said filter assembly comprising:

upper and lower support plates;

a plurality of filter cartridges supported between said upper and lower support plates, said upper and lower support plates being permanently fastened to upper and lower ends respectively of each said filter cartridge, and each said filter cartridge including an elongate, generally cylindrical filter media component interengaged at an upper end thereof with a respective upper positioning element attached to and depending from said upper support plate, said cartridge being interengaged at a lower end thereof with a respective lower positioning element attached to and projecting upwardly from said lower support plate, said respective upper and lower positioning elements being generally aligned and holding each said filter cartridge in a fixed position between said upper and lower support plates;

each said upper positioning element being surrounded by a corresponding upper annular seal carried by said upper support plate for engaging and dealing said upper end of said filter media component of a respective said cartridge to restrict fluid flow between said upper plate and said upper end of said filter media component;

each said lower positioning element being surrounded by a corresponding lower annular seal carried by said lower support plate for engaging and sealing said lower end of said filter cartridge to restrict fluid flow between said lower support plate and said lower end of said filter cartridge; and at least one swimming pool canister filter assembly inlet and at least one swimming pool canister filter assembly outlet that communicate respectively with the fluid inlet and outlet lines of the filter housing.

4. The assembly of claim 3 in which said filter media component includes a depth filter media.

5. A multiple cartridge fluid filter canister for operatively mounting within a filter housing, which housing includes a fluid inlet and a fluid outlet, said filter canister assembly comprising:

upper and lower support plates;

a plurality of filter cartridges fastened between said upper and lower support plates, said upper and lower support plates being permanently fastened to upper and lower ends respectively of each said filter cartridge and each said filter cartridge including an elongate, generally cylindrical filter media component for communicably interconnecting the fluid inlet and fluid outlet of the filter housing.

6. The assembly of claim 5 in which each filter cartridge is adhesively attached at its upper end to said upper support plate and at its lower end to said lower support plate.

7. The assembly of claim 5 further including at least one filter canister assembly inlet and at least one filter canister outlet that communicate respectively with the fluid inlet and fluid outlet of the filter housing.

8. The assembly of claim 7 in which said filter cartridge includes an elongate conduit extending longitudinally axially through said filter media component, said conduit being communicably interconnected between said filter media component and one of said filter canister inlet and said filter canister outlet for conducting fluid between the fluid inlet and fluid outlet of the filter housing.

9. The assembly of claim 5 in which said filter media component includes a depth filter media.

10. The filter assembly of claim 5 in which each said filter media component is interengaged at said upper end thereof with a respective upper positioning element attached to and depending from said upper support plate, said cartridge being interengaged at said lower end thereof with a respective lower positioning element attached to and projecting upwardly from said lower support plate, said respective upper and lower positioning elements being generally aligned and holding each said filter cartridge in a fixed position between said upper and lower support plates.

11. The filter assembly of claim 10 in which each said upper positioning element is surrounded by a corresponding upper annular seal carried by said upper support plate for engaging and sealing said upper end of said filter media component of a respective said cartridge to restrict fluid flow between said upper plate and said upper end of said filter media component, said lower positioning element being surrounded by a corresponding lower annular seal carried by said lower support plate for engaging and sealing said lower end of said filter cartridge to restrict fluid flow between said lower support plate and said lower end of said filter cartridge.

12. The assembly of claim 10 in which each filter cartridge includes an elongate tubular member extending between a corresponding pair of said upper and lower positioning elements, said tubular member being surrounded by a respective said filter media component.

13. The assembly of claim 12 in which at least one of said lower positioning elements includes a standpipe attached to said lower support plate and defining an opening that extends through said lower support plate.

14. The assembly of claim 13 in which, said upper positioning element includes a stud that is received by an upper end of said tubular member for positioning said filter cartridge thereon.

15. The assembly of claim 12 in which said tubular member is interengaged at upper and lower ends thereof respective with said upper and lower positioning elements.

16. The assembly of claim 12 in which at least one of said upper and lower positioning elements includes a pipe for transmitting fluid flow therethrough.

17. The assembly of claim 16 in which said elongate tubular member includes a series of perforations that permit fluid flow between said filter media component and an interior of said elongate tubular member.

\* \* \* \* \*